(12) United States Patent
Frederick

(10) Patent No.: US 8,944,240 B2
(45) Date of Patent: Feb. 3, 2015

(54) PHASE AND AXIAL ADJUSTABLE TRANSPORT DRIVE SYSTEM

(75) Inventor: Paul A. Frederick, Harrison, OH (US)

(73) Assignee: R. A. Jones & Co., Covington, KY (US)

( * ) Notice: Subject to any disclaimer, the term of this patent is extended or adjusted under 35 U.S.C. 154(b) by 417 days.

(21) Appl. No.: 13/285,559

(22) Filed: Oct. 31, 2011

(65) Prior Publication Data

US 2012/0103760 A1   May 3, 2012

Related U.S. Application Data

(60) Provisional application No. 61/456,011, filed on Oct. 29, 2010.

(51) Int. Cl.
*B65G 17/00* (2006.01)
*B65G 17/26* (2006.01)

(52) U.S. Cl.
CPC ..................... *B65G 17/26* (2013.01)
USPC ........................ 198/611; 198/834

(58) Field of Classification Search
None
See application file for complete search history.

(56) References Cited

U.S. PATENT DOCUMENTS

| 4,254,604 | A | * | 3/1981 | Vogel et al. | 53/566 |
| 4,718,540 | A | * | 1/1988 | Greenwell | 198/620 |
| 5,341,915 | A | * | 8/1994 | Cordia et al. | 198/460.1 |
| 5,369,942 | A | * | 12/1994 | Olson | 53/566 |

* cited by examiner

*Primary Examiner* — Kavel Singh
(74) *Attorney, Agent, or Firm* — Wood, Herron & Evans, LLP

(57) ABSTRACT

A transport drive system for a carton transport conveyor includes a shaft, a first pair of drive members, a second pair of drive members, and a phase adjustment hub connected to the shaft. A first set of drive members includes a drive member of the first pair and a drive member of the second pair, and the first set of drive members is rotationally fixed with respect to the shaft. A second set of drive members includes another drive member of the first pair and another drive member of the second pair, and the second set of drive members is rotationally fixed with respect to the phase adjustment hub. The phase adjustment hub is angularly adjustable with respect to the shaft to adjust the angular phase of the sets, while the pairs are adjustably spaced one from the other.

21 Claims, 7 Drawing Sheets ly. Lead
PHASE AND AXIAL ADJUSTABLE TRANSPORT DRIVE SYSTEM

PRIORITY CLAIM

Benefit of the filing date of U.S. Provisional Patent Application Ser. No. 61/456,011 filed on Oct. 29, 2010, which is incorporated by reference herein in its entirety, is claimed.

TECHNICAL FIELD

This invention relates to material handling and more particularly to adjustable drives for conveyors and transporters. The invention has particular utility to applications for transporting cartons of varied length and depth parameters.

BACKGROUND

In packaging equipment it is common and necessary to adjust a carton transport conveyor for changes in carton sizes. These carton size changes relate to carton length (machine direction), carton depth (cross machine direction) and carton width (elevation off of transport conveyor). Changes to the carton length dimension generally affect the phase relationship between adjacent drive members (sprockets) on a common drive shaft. Whereas, changes to the carton depth dimension affect the axial or transverse location of adjacent drive members on a common drive shaft. Carton width changes do not generally affect the drive system.

More particularly, it will be appreciated that in a carton transport conveyor, for example, product is transported along a rail or rails by chain-driven lugs. For example, a pair of leading lugs is respectively mounted abreast on two respective parallel leading lug chains that are driven in unison. A pair of trailing lugs is respectively mounted abreast on two other respective parallel trailing lug chains, providing a sufficient distance between the leading and trailing lugs to receive cartons therebetween for transport. Cartons are situated between the leading lugs and the trailing lugs and are transported in a machine direction such as along a rail. The leading lug chains are typically mounted on and driven by axially spaced leading lug chain drive sprockets and the trailing lug chains on axially spaced trailing lug chain drive sprockets.

To accommodate a change to handle cartons of varied length, the distance between the leading and trailing lugs must be adjusted. And to accommodate a change to handle cartons of varied depth, the axial distance between each leading lug and between each trailing lug must also be adjusted.

Several methods of phase adjustment have been used in the past. One method uses long keyways cut into the drive shaft and sprockets with radial slots mounted to keyed hubs. This method requires that each individual member be manually adjusted and calibration is crude and often not repeatable. Additionally, access for a user is awkward requiring that the user reach across the machine or walk to the backside of the machine. A slight variation would be to replace the key and hub with a spline and splined hubs.

Another method has a system where each drive member, of which there are four, is driven separately by four individual servo motors. While this method solves the access and calibration requirements it is generally cost prohibitive in many applications.

Axial adjustment has required a separate system ranging from lead screws to racks and pinion gears. Typically, two adjustment points of the conveyor are connected with a shaft to insure that both ends of the conveyor move equally. Lead screws have also been used for multiple point adjustment, usually requiring a chain or belt to connect two or more screws in order to synchronize the movement.

There is a need, therefore, in the area of carton transport conveyors for apparatus to facilitate the phase and axial adjustment of a transport drive system. Preferably, such apparatus would allow adjustments to be made from a single point at the front side of a carton transport conveyor.

SUMMARY

In summary, a preferred embodiment of the invention includes a carton transport conveyor having leading and trailing carton lugs carried on respective leading and trailing endless lug chain drive chains. Preferably, two leading and two trailing lug chains carry leading lugs and trailing lugs abreast in sets of two. According to the invention, these are adjustable in relative phase to vary the lug spacing from each other and thus accommodate varied carton lengths.

The chains are driven by separate drive sprockets with the drive sprockets for the leading lug chains moving in unison and other drive sprockets for the trailing lug chains also moving in unison, in an adjustable angular phase with respect to the drive sprockets for the leading lug chains.

There is thus a set of two leading lug chain drive sprockets and a set of two trailing lug chain drive sprockets. There are two pairs of lug chain drive sprockets, each pair including a leading lug chain drive sprocket and a trailing lug chain drive sprocket. A set is coupled to a primary drive. The other set including the other two sprockets, one from each pair, is indirectly coupled to the primary drive through a phase adjustment hub so that the two drive sprocket sets may be driven in unison, but with one set at a predetermined phase or angular disposition with respect to the other set. Accordingly, the greater the angular phase differential between the sets, the further apart are the leading and trailing lugs.

In another aspect of the invention, the lug chains are associated operably with parallel carton supporting rails, with one leading lug chain and one trailing lug chain preferably proximate each rail. Accordingly, a pair of one leading lug chain drive sprocket and one trailing lug chain drive sprocket are closely associated proximate one another at an end of such a rail, while another pair of leading and trailing lug chain drive sprockets are closely associated with another rail spaced parallel to but transverse from the first rail. When carton depth adjustment is desired, one rail is moved transversely with respect to the other, with the chains and the other pair of leading and trailing lug chain drive sprockets also transversely displaced relative to the first pair of drive sprockets. Thus, the respective drive sprocket pairs must be transversely adjustable without disturbing the ability to adjust the phase between the leading lug chain drive sprocket set and the trailing lug chain drive sprocket set.

This is accomplished by a slidable interconnection of at least one pair of leading and trailing lug chain drive sprockets with respect to the primary drive or the phase adjustment hub drive to which they are connected.

Alternative embodiments include separate motive drivers for each of the respective primary drive shaft and the phase hub drive.

Another alternative embodiment contemplates driving both sets of leading and trailing lug chain drive sprockets with respective sets of drive shafts radially spaced from a common drive axis but with no common axis drive shaft.

For purposes of description herein, two leading lug chain drive sprockets are referred to as a set, driven in unison but adjustable in an axial direction with respect to each other. The trailing lug chain drive sprockets are also referred to as a set, driven together in unison, but adjustable in an axial direction with respect to each other and driven in an adjustable phase with respect to the set of leading lug chain drive sprockets. One sprocket (leading and trailing) of each set forms, with a sprocket from the other set, a first pair, while the remaining sprockets (leading and trailing) form a second pair. The sets are angularly adjustable in phase, one to the other, while the pairs are adjustable transversely toward and away from each other.

Finally, it will be appreciated these embodiments may be applied in environments other than carton conveyors where both phase and transverse drive adjustments are useful.

DESCRIPTION OF THE EMBODIMENTS

A familiar design for a carton transport conveyor with which the invention is associated includes a pair of parallel transport beams, with a carton rail supported by each. Product may be conveyed along the rail in cartons by a lug system including leading lugs and trailing lugs carried on respective chains proximate the beams. A carton may fit between a pair of leading lugs at a forward side and a pair of trailing lugs at a trailing side, with one of the leading lugs being associated with or proximate to one transport beam and the other leading lug being associated with or proximate to the other transport beam, and likewise for the trailing lugs. The distance from one point relative to one carton to the same point relative to a following carton is known in the art as the "pitch". Each transport beam in a carton transport conveyor is associated with a set of leading lugs and trailing lugs, with the leading lugs being attached to a leading lug chain and the trailing lugs being attached to a trailing lug chain. Each leading lug chain and each trailing lug chain associated with a transport beam is driven along a looped path by a drive sprocket pair that includes a leading lug chain drive sprocket for driving the leading lug chain and a trailing lug chain drive sprocket for driving the trailing lug chain. Preferably, two leading lug chains and two trailing lug chains are used, each driven by respective driving sprockets. Each drive sprocket pair of sprockets drives the leading lug chain drive sprocket and trailing lug chain drive sprocket in unison, so the leading lug chains and the trailing lug chains of both transport beams move along the looped path at the same rate, and a distance responsive to the angular phase between drive sprocket sets is maintained between abreast leading lugs and abreast trailing lugs for receiving a carton (i.e. the chains move together).

Figure 1:
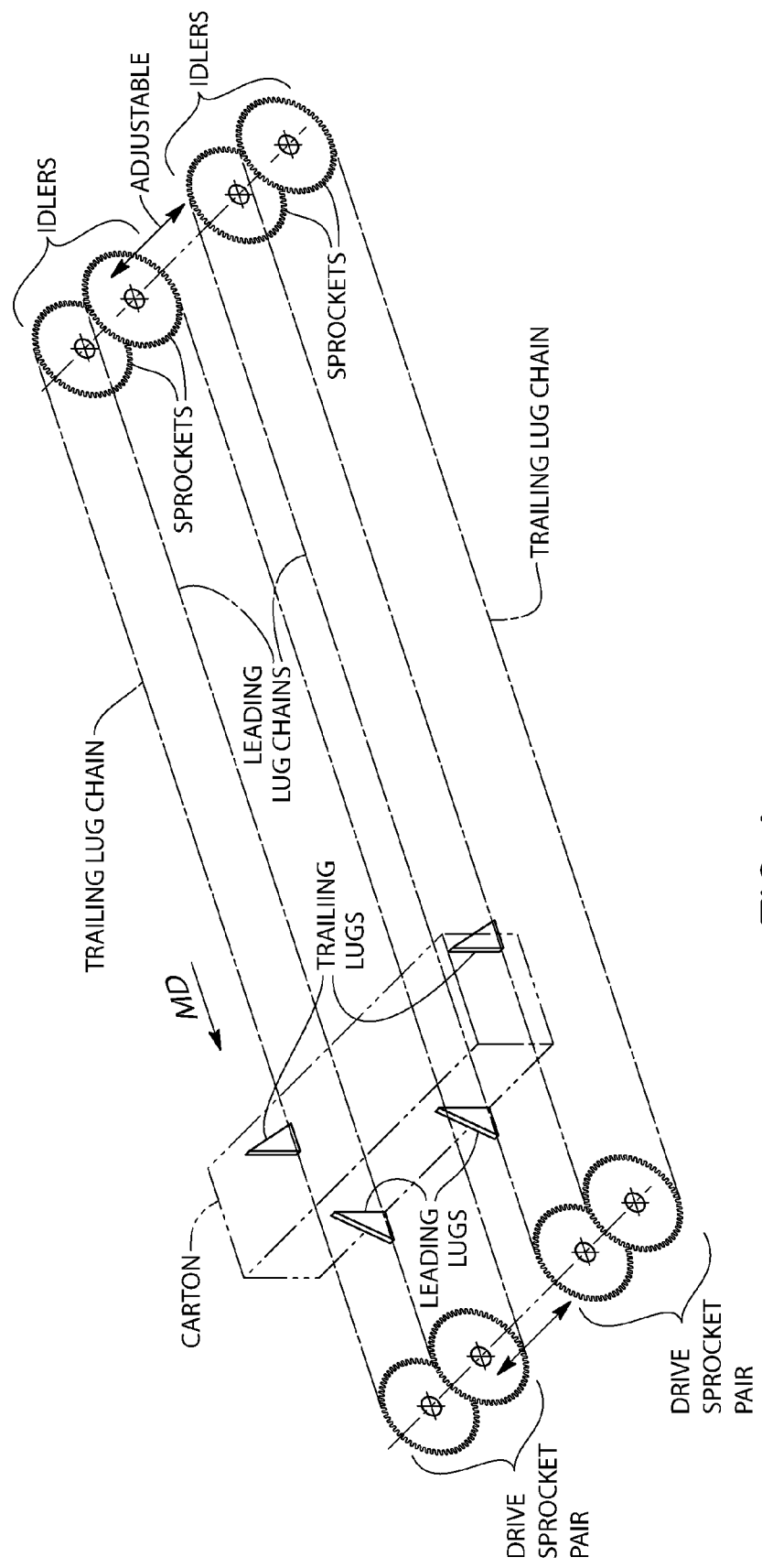
FIG. 1 is an isometric schematic depiction of features of a carton transport conveyor showing a carton between leading and trailing lugs.

FIG. 1 is a schematic representation of features of a typical carton transport conveyor for illustrating the features noted above. The rails have been removed in that figure, and a carton is shown being situated between abreast leading lugs and abreast trailing lugs. The carton moves in a machine direction as indicated by the arrow and the designation MD. The leading lugs are carried by leading lug chains and the trailing lugs are carried by trailing lug chains. A drive sprocket pair includes a leading lug chain drive sprocket and a trailing lug chain drive sprocket, and there are two drive sprocket pairs, according to the invention.

Figure 2:
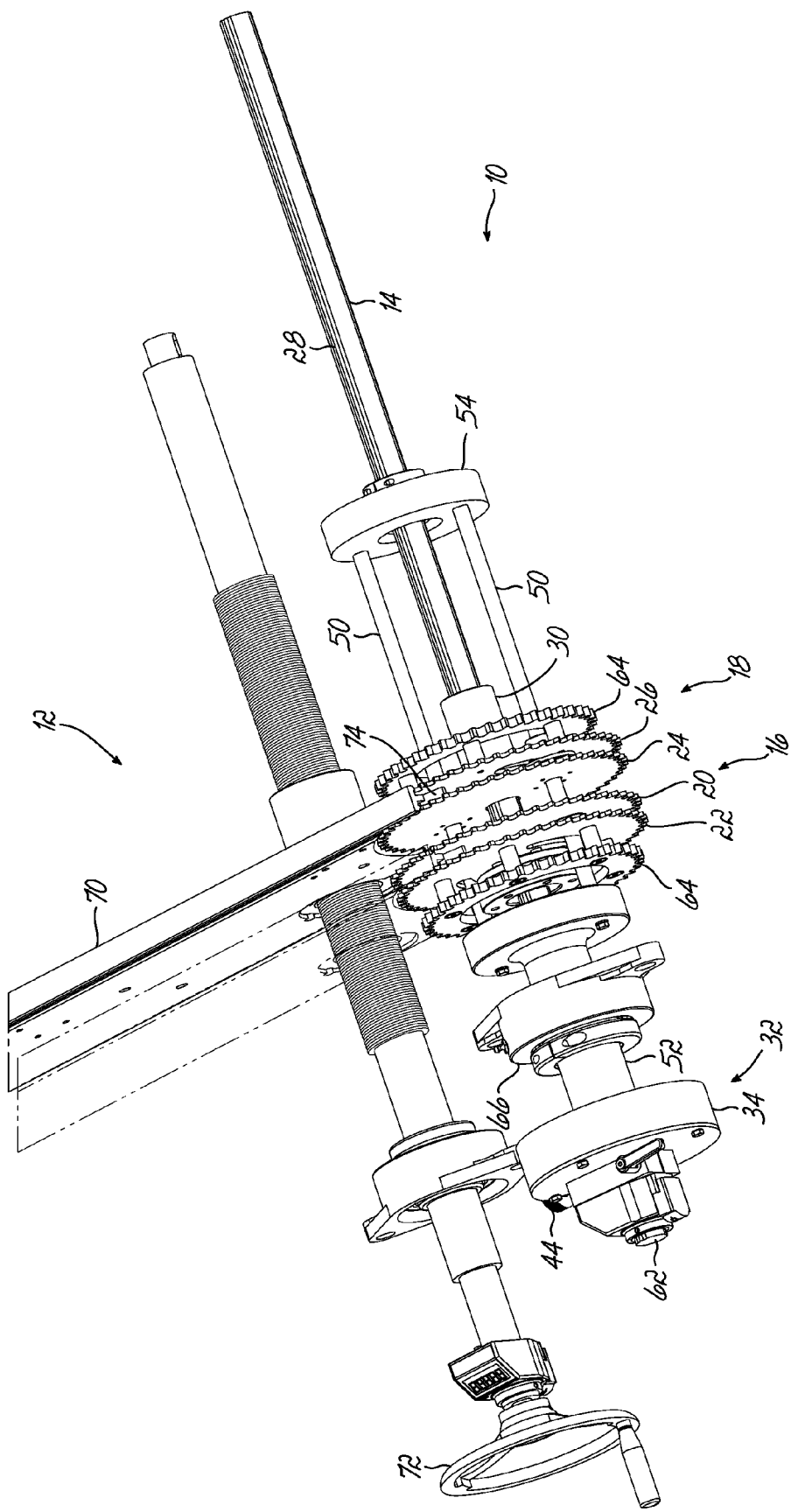
FIG. 2 is a partial disassembled top isometric view of a carton transport conveyor showing a transport drive system and an axial positioning system.
Figure 3:
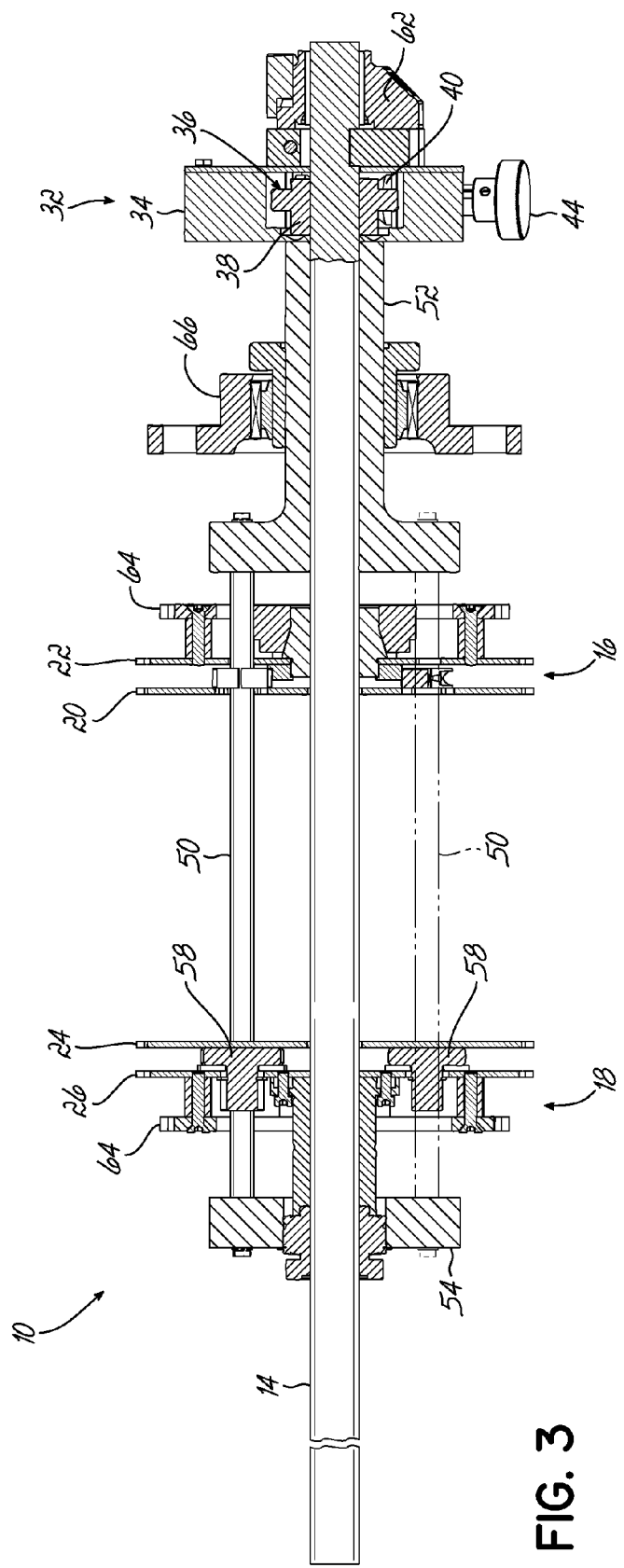
FIG. 3 is a cross sectional view showing features of the transport drive system of FIG. 2.
Figure 4:
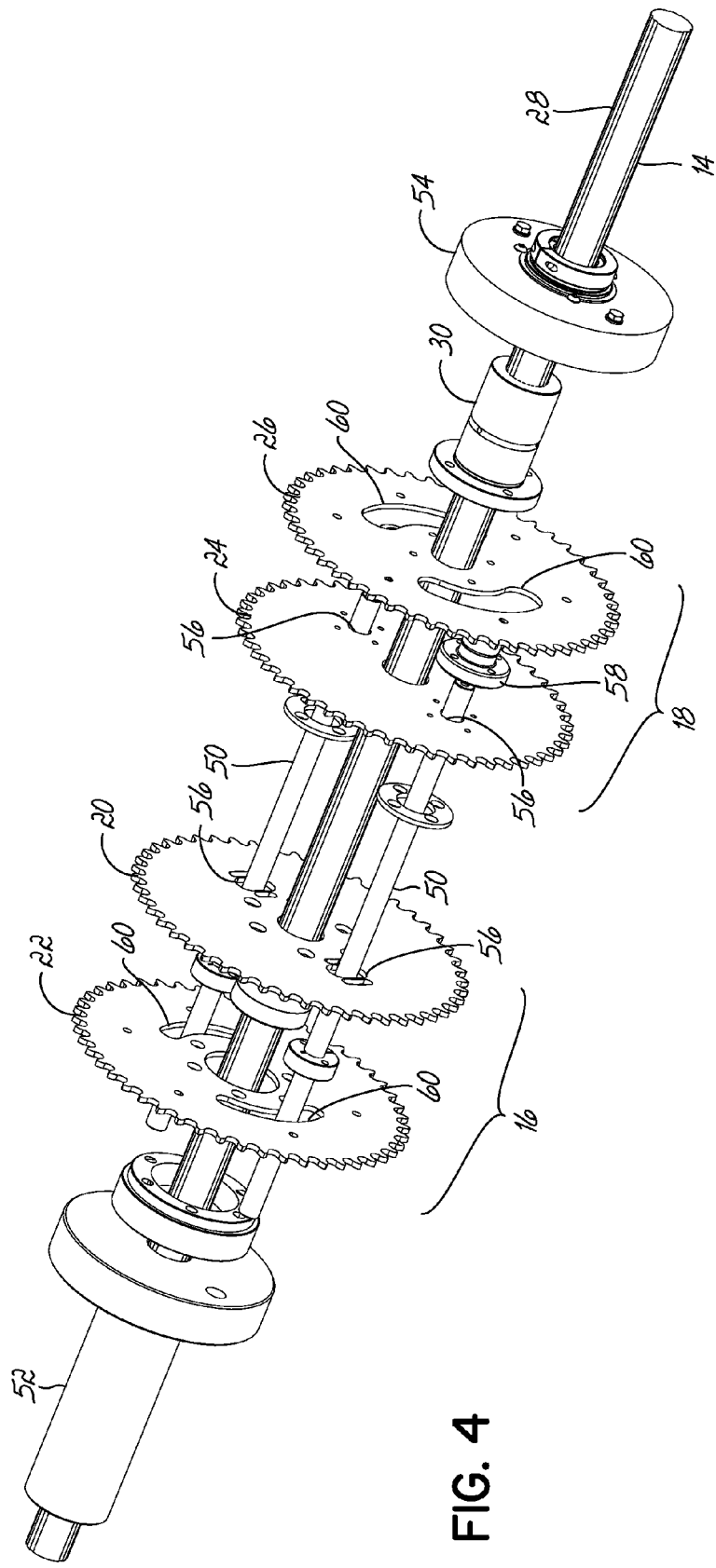
FIG. 4 is a partial isometric exploded view showing features of the transport drive system of FIGS. 2-3, but with the optional sprockets 64 omitted for clarity.
Figure 5:
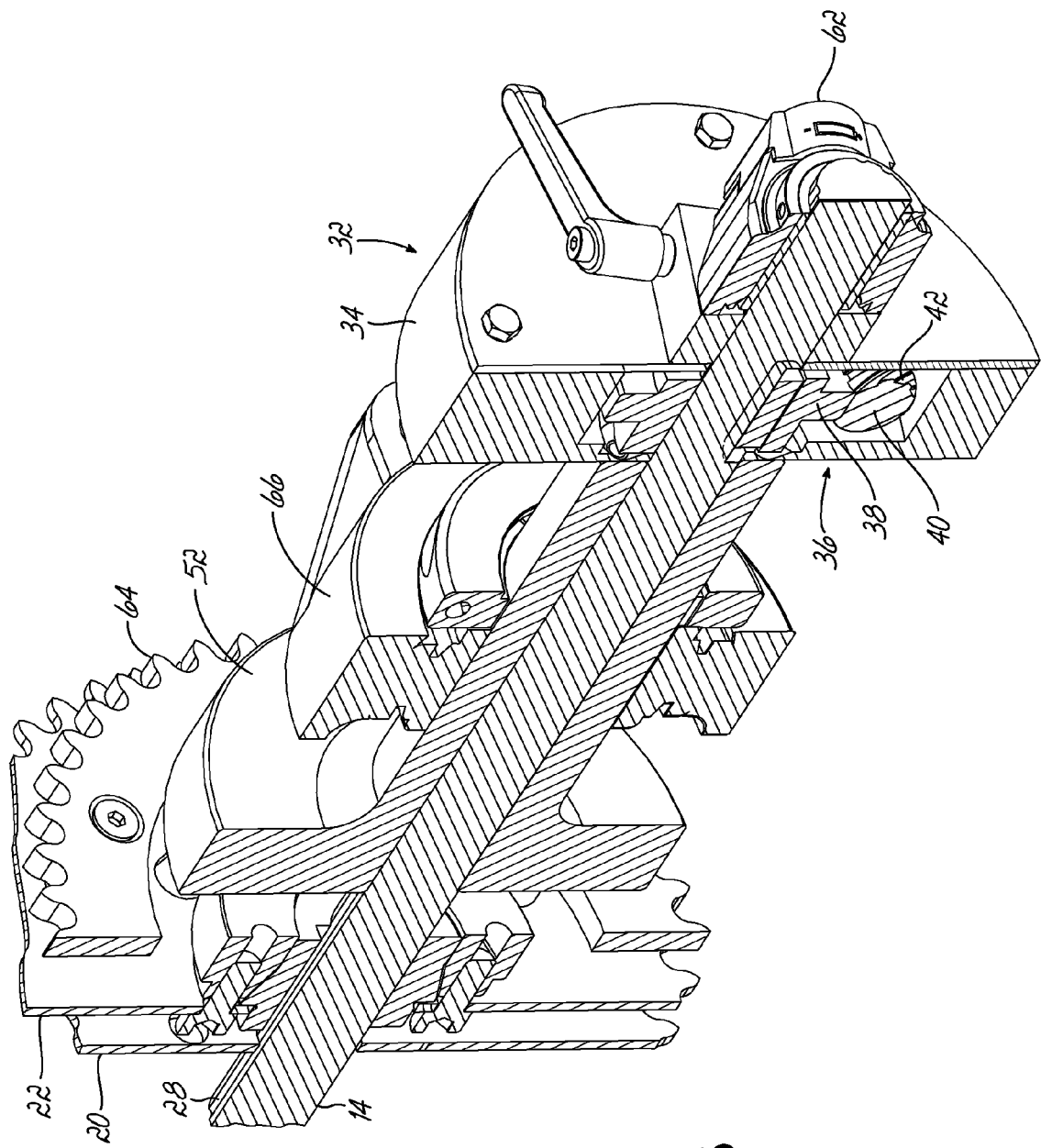
FIG. 5 is a close-up isometric view in cross section showing features of a phase adjustment hub.

Referring to FIG. 2, a transport drive system for a carton transport conveyor is shown and is generally indicated by the numeral 10. The transport drive system 10 includes features for adjusting the phase between the respective drive members driving sets of leading lugs and trailing lugs. An axial positioning system 12 includes features for adjusting the axial distance between transport beams and drive sprocket pairs, described more fully below, and is useful to adjust the axial distance between pairs of lugs.

The transport drive system 10 includes a drive shaft 14, a fixed drive sprocket pair 16, and a moving drive sprocket pair 18, all of which rotate synchronously about a common single axis. The fixed drive sprocket pair 16 includes a leading lug chain drive sprocket 20 and a trailing lug chain drive sprocket 22. Here, the term "fixed" refers to lateral fixation so the "fixed" pair does not move laterally along the shaft 14. "Fixed" is also used with respect to rotation, and the descriptions provided herein clarify how the term is used. The moving drive sprocket pair 16 includes a leading lug chain drive sprocket 24 and a trailing lug chain drive sprocket 26. The term "moving" refers to the ability of the pair 18 to shift in an axial direction along the shaft 14. While drive sprockets are shown and described, it will be evident that these may be referred to generally as drive members and that other types of drive members can also be used in the transport drive system 10. It will be appreciated that the drive chains extend around idler sprockets at another end of the conveyor (FIG. 1) that are also axially adjustable.

The fixed drive sprocket pair 16 and the moving drive sprocket pair 18 drive the respective leading lug chains and trailing lug chains of a carton transport conveyor, such as those shown and described with respect to FIG. 1. The fixed drive sprocket pair 16 does not move in the axial or transverse direction, whereas the moving drive sprocket pair 18 can, when adjusted, with this relative movement between the drive sprocket pairs being indicated by the arrow in FIG. 1. Both drive sprocket pairs 16, 18 are rotatable. The shaft 14 includes features, such as a spline 28, for allowing the moving drive sprocket pair 18 to slide or translate along the length of the shaft 14 (which is referred to as the axial direction), while maintaining the respective rotational orientation of the sprockets in the moving drive sprocket pair 16. The fixed drive sprocket pair 16 does not move axially along the length of the shaft 14. Thus, the moving drive sprocket pair 18 is axially slidable with respect to the fixed drive sprocket pair 16, such as may be desirable for accommodating cartons of different depth.

The trailing lug chain drive sprockets 22, 26 are rotationally fixed with respect to the shaft 14. In particular, the fixed trailing lug chain drive sprocket 22 is rotationally fixed to the shaft 14, and is not slidable axially along the shaft. The moving trailing lug chain drive sprocket 26 is also rotationally fixed to the shaft 14, but is slidable axially along the shaft and may be coupled to a spline nut 30 for engaging with the spline 28 in the shaft 14 so as to maintain a rotational position of the moving trailing lug chain drive sprocket 26 with respect to the fixed trailing lug chain drive sprocket 22 and the shaft 14.

A phase adjustment hub 32 provides structure for adjusting the relative phase between the leading lug chain drive sprockets 20, 24, and the trailing lug chain drive sprockets 22, 26, which ultimately adjusts the distance between the leading lugs and trailing lugs by adjustment of the relative phases of the respective sprockets and lug carrying chains. In particular, the phase adjustment hub 32 includes a housing 34 that contains a worm gear assembly 36. The worm gear assembly 36 includes a worm gear 38 attached to the shaft 14, and a worm 40. The worm 40 includes a shaft having a threaded portion 42 and a knob 44 that extends out of the housing 34 for access and manipulation by a user. The worm 40 is rotatable in housing 34 but held against axial movement therein. The threaded portion 42 of the worm 40 engages the worm gear 38 and, other than being free to rotate, is maintained in a fixed relationship with respect to the housing 34, principally because of the frictional engagement or relationship between the worm 40 and the worm gear 38. If desired, a frictional lock of any suitable construction can be used to maintain the worm gear 38 against rotation once it is set. Accordingly, rotation of the worm 40 causes rotation of the phase adjustment hub 32 with respect to the shaft 14. If the housing 34 of the phase adjustment hub 32 is held stationary and a user grips and turns the knob 44 to turn the worm 40, the worm gear 38 and the shaft 14 rotate. Or, if the shaft 14 is held stationary and a user grips and turns the knob 44 to turn the worm 40, the phase adjustment hub 32 rotates. Either way, the phase adjustment hub 32 is rotatably adjustable with respect to the shaft 14 by way of the worm gear assembly 36. However, when the shaft 14 rotates in use, the phase adjustment hub 32 rotates with it and the rotational phase relationship between the two is maintained.

The leading lug chain drive sprockets 20, 24 are rotationally fixed with respect to the phase adjustment hub 32. In particular, the leading lug chain drive sprockets 20, 24 are connected to the phase adjustment hub 32 by a pair of parallel leading drive shafts 50, but are not fixed to shaft 14 about which they are oriented. In the figures, the leading drive shafts 50 are indirectly connected to the phase adjustment hub 32 through an extension 52, but in some embodiments, the extension 52 may not be included. At their other end, the leading drive shafts 50 are connected to a free spinning shaft support 54 which is rotatably situated on, but not fixed to, the shaft 14. The shaft support 54 supports the leading drive shafts 50 and allows them to freely rotate about the shaft 14. The leading drive shafts 50 are parallel to one another and the shaft 14. Of course, different configurations of leading drive shafts could be used to connect the leading lug chain drive sprockets 20, 24 to the phase adjustment hub 32, such as, for example, three or four drive shafts, or drive shafts having a different shape.

The leading lug chain drive sprockets 20, 24 include drive shaft bores 56 for engaging with the leading drive shafts 50. In particular, the drive shaft bores 56 have a shape complementary to the leading drive shafts 50. The fixed leading lug chain drive sprocket 20 is connected to the leading drive shafts 50 and is not axially slidable. The moving leading lug chain drive sprocket 24 is connected to the leading drive shafts 50, and can include linear bearings 58 for facilitating its axial movement and for supporting the leading drive shafts 50.

The trailing lug chain drive sprockets 22, 26 include arcuate slots 60 for accommodating arcuate movement of the leading drive shafts 50 with respect thereto. In particular, the arcuate slots 60 extend along a portion of a circular pathway radially inside the toothed portion of the trailing lug chain drive sprockets 22, 26 and concentric with the shaft 14. The extent or length of the slots 60 can be chosen to accommodate a phase adjustment in a degree equal to the desired range of phase adjustment, preferably equal to at least one predetermined "pitch".

Thus, the trailing lug chain drive sprockets 22, 26 are fixed in rotation with respect to the shaft 14, the phase adjustment hub 32 is rotatably adjustable with respect to the shaft 14, and the leading lug chain drive sprockets 20, 24 are fixed in rotation with respect to the phase adjustment hub 32. As the phase adjustment hub 32 is rotated with respect to the shaft 14 (by a user turning the knob 44, for example), the leading drive shafts 50 and the leading lug chain drive sprockets 20, 24 rotate about the shaft 14, and the arcuate slots 60 accommodate the arcuate movement and rotation of the leading drive shafts 50 as the phase is adjusted. Once the phase is adjusted, rotation of the shaft 14 causes rotation of all the lug chain drive sprockets 20, 22, 24, and 26, directly or through the phase adjustment hub 32. And because the phase adjustment hub 32 is rotatably or angularly adjustable with respect to the shaft 14, the phase between the leading lug chain drive sprockets 20, 24 and the trailing lug chain drive sprockets 22, 26 may be adjusted, which results in an adjustment of the distance between the leading and trailing lugs.

The shaft 14 of the transport drive system 10 may be rotated or driven by any suitable device, such as by pulleys, sprockets, driver couplings, motors and the like, which are not shown in the FIGS. 1-5. Moreover, either or both ends of the shaft 14 may be supported in a free spin bearing or similar structure for facilitating the rotation of the shaft 14.

As shown in the figures, a counter 62 may be included with the transport drive system 10 on the phase adjustment hub 32 to provide a visual aid or indication about the relative angular phase between the leading and trailing lug chain drive sprockets.

One or more auxiliary sprockets 64 may optionally be disposed on the shaft 14 for driving an accessory, such as a speed belt system that accelerates cartons off the carton transport conveyor. And, a bearing assembly 66 may optionally be used in some embodiments for supporting the extension 52.

In the figures, a particular arrangement is shown where the leading lug chain drive sprockets 20, 24 are positioned between the trailing lug chain drive sprockets 22, 26. Also, the trailing lug chain drive sprockets 22, 26 are fixed in rotation with respect to the shaft 14, and the leading lug chain drive sprockets 20, 24 are fixed to rotate with the adjustment hub 32. Other configurations are also possible while maintaining the adjustments described herein. Generally, it will be appreciated that one set of driving members (whether leading or trailing) is rotationally fixed with respect to the shaft 14, and the other set of driving members (the other of leading or trailing) is rotationally fixed with respect to the phase adjustment hub 32.

Referring again to FIG. 2, the axial positioning system 12 may be used for adjusting the axial distance between transport beams of a carton transport conveyor, and between the respective lugs, chains and sprockets. So, the axial positioning system 12 may adjust the axial distance between the fixed drive sprocket pair 16 and the moving drive sprocket pair 18. The axial positioning system includes structure for moving a transport beam 70 associated with the moving drive sprocket pair 18 in the axial or transverse direction. This structure for moving the transport beam may be a lead screw arrangement, for example, where a hand wheel 72 accessible by a user may be turned to affect axial movement of the transport beam 70. The two transport beams of a carton transport conveyor are maintained in parallel relationship to one another and may include idler sprockets at an end away from the drive sprocket pairs 16, 18. Adjustment using the hand wheel 72 is reproduced at the idler sprockets so as to maintain the parallel relationship of the transport beams. A yoke 74 is attached to the transport beam 70 and engages the moving drive sprocket pair 18, such as between the moving leading lug chain drive sprocket 24 and the moving trailing lug chain drive sprocket 26, as shown in FIG. 2. Accordingly, movement of the transport beam 70 is transferred to the moving drive sprocket pair 18 through the yoke 74. In some embodiments, the yoke 74 may take the form of one or more fingers extending from the transport beam, with each finger having a thickness of substantially equal to the distance between the moving leading lug chain drive sprocket 24 and the moving trailing lug chain drive sprocket 26.

Figure 6:
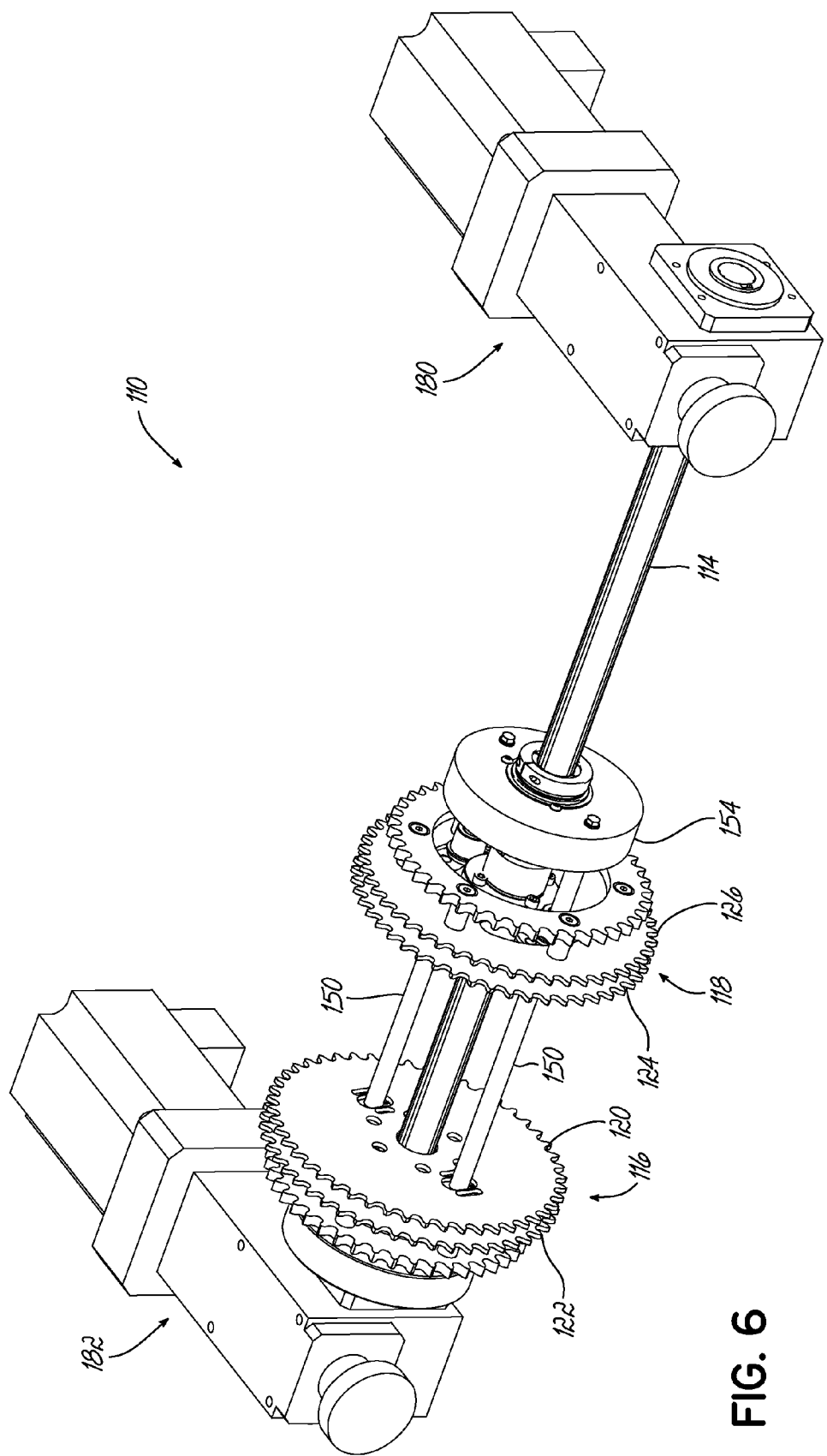
FIG. 6 is an isometric view of an alternative transport drive system for a carton transport conveyor.

With reference to FIG. 6, an alternative transport drive system 110 is shown, and unless otherwise noted can include features similar to the transport drive system 10. The transport drive system 110 includes a shaft 114, a fixed drive pair 116, and a moving drive pair 118. The fixed drive pair 116 includes a fixed leading lug chain drive sprocket 120 and a fixed trailing lug chain drive sprocket 122. The moving drive pair 118 includes a moving leading lug chain drive sprocket 124 and a moving trailing lug chain drive sprocket 126. The moving drive pair 118 is axially slidable along the shaft 114, but the fixed drive pair 116 is not. The transport drive system 110 also includes parallel drive shafts 150, which may be supported by a free spinning shaft support 154.

The transport drive system 110 includes two drive assemblies, with the shaft 114 being coupled with and driven by a first drive assembly 180 and the parallel drive shafts 150 being coupled with and driven by a second drive assembly 182. The drive assemblies 180, 182 can be servo motors, or any other suitable driver or device for driving the transport drive system 110, such as by pulleys, sprockets, driver couplings, motors and the like. The leading lug chain drive sprockets 120, 124 are rotationally fixed with respect to the shaft 114, and the trailing lug chain drive sprockets 122, 126 are rotationally fixed with respect to the parallel drive shafts 150. The trailing lug chain drive sprockets 122, 126 include arcuate slots (not visible, but similar to those described with respect to the transport drive system 10) for accommodating rotational adjustment of the shafts 150 about the shaft 114. The drive assemblies 180, 182 may be independently controlled, and phase adjustment between the leading lug chain drive sprockets 120, 124 and the trailing lug chain drive sprockets 122, 126 may be accomplished by moving one of them with respect to the other, such as by using the second drive assembly 182 to move the parallel drive shafts 150 with respect to the shaft 114.

Figure 7:
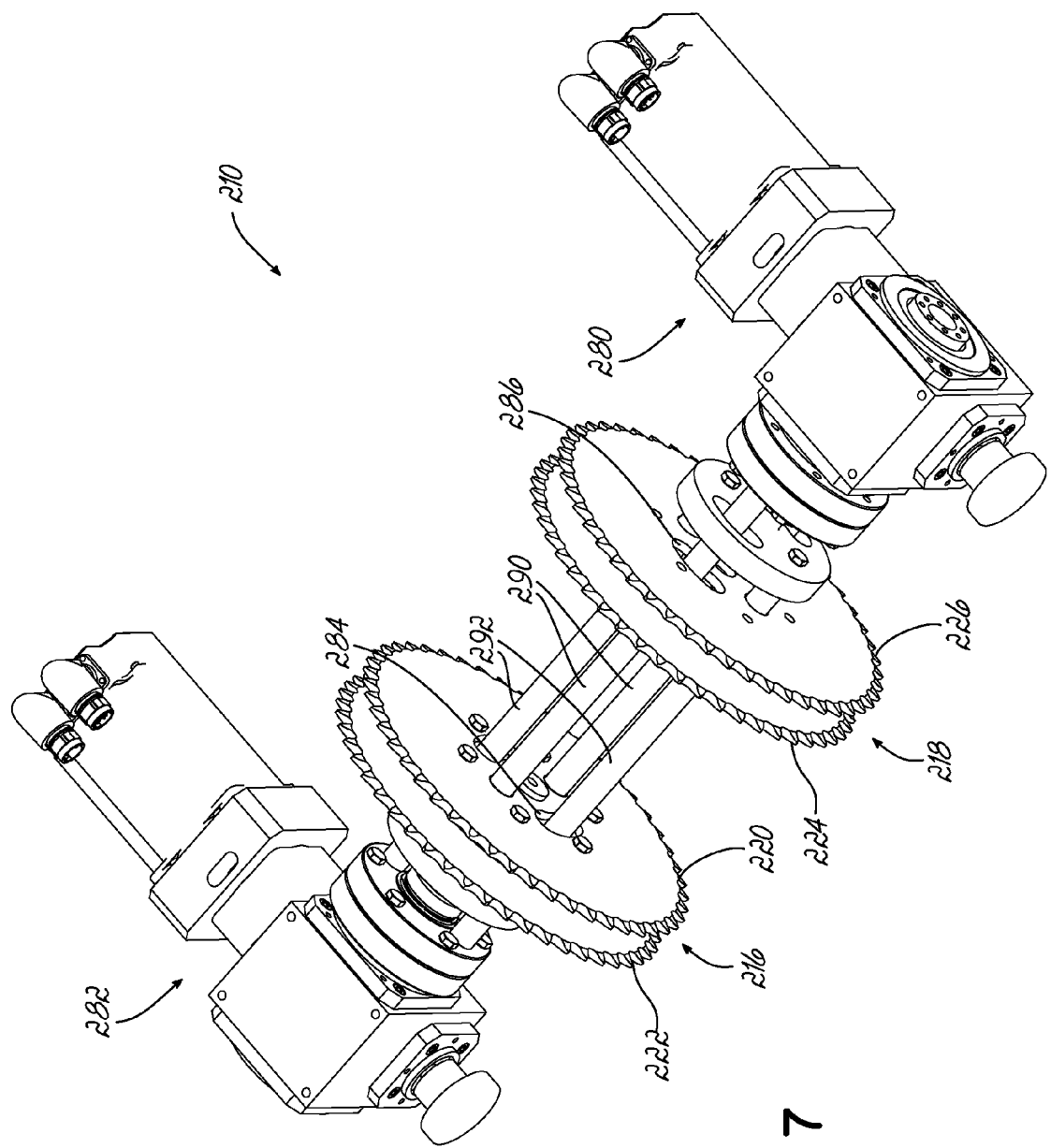
FIG. 7 is an isometric view of another alternative transport drive system for a carton transport conveyor.

With respect to FIG. 7, another transport drive system 210 is shown, and unless otherwise noted can include features similar to the transport drive system 110. The transport drive system 210 includes a first drive pair 216 and a second drive pair 218. The first drive pair 216 includes a first leading lug chain drive sprocket 220 and a first trailing lug chain drive sprocket 222. The second drive pair 218 includes a second leading lug chain drive sprocket 224 and a second trailing lug chain drive sprocket 226. The transport system 210 includes a pair of first parallel drive shafts 290 and a pair of second parallel drive shafts 292. There is no centrally located shaft such as the shafts 14 or 114 in the previous embodiments The transport drive system 210 includes two drive assemblies 280, 282, with the first parallel drive shafts 290 being coupled with and driven by a first drive assembly 280 and the second parallel drive shafts 292 being coupled with and driven by a second drive assembly 282. The drive assemblies 280, 282 can be servo motors, or any other suitable driver or device for driving the transport drive system 210, such as by pulleys, sprockets, driver couplings, motors and the like. The leading lug chain drive sprockets 220, 224 are rotationally fixed with respect to first parallel drive shafts 290, and the trailing lug chain drive sprockets 222, 226 are rotationally fixed with respect to the second parallel drive shafts 292. The leading lug chain drive sprockets 220, 224 include arcuate slots 284 for accommodating phase adjustment rotation of the shafts 292, and the trailing lug chain drive sprockets 222, 226 include arcuate slots 286 for accommodating phase adjustment rotation of the shafts 290. The drive assemblies 280, 282 may be independently controlled, and phase adjustment between the leading lug chain drive sprockets 220, 224 and the trailing lug chain drive sprockets 222, 226 may be accomplished by moving one of them with respect to the other, such as by using the first drive assembly 280 to move the first parallel drive shafts 290 with respect to the second parallel drive shafts 292, or by using the second drive assembly 282 to move the second parallel drive shafts 292 with respect to the first parallel drive shafts 290.

Transport drive systems constructed according to the concepts disclosed herein offer several advantages over prior art forms. For one, precise phase adjustment may be achieved for accommodating cartons of different length. Moreover, this adjustment may be achieved from a single position, without requiring a user to directly manipulate any of the drive sprockets. Moreover, an axial positioning system may be used to adjust the axial distance between a fixed drive sprocket pair and a moving drive sprocket pair. The axial positioning system may be situated near a phase adjustment hub of the transport drive system, thereby providing a user with controls for adjusting the phase and axial distances in the transport drive system from a single location. In addition, transport drive systems controlled by two drive assemblies are more economical than those controlled by four drive assemblies.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A transport drive system for a carton transport conveyor, the transport drive system comprising:
   an elongated shaft,
   a first pair of drive members,
   a second pair of drive members,
   said first and second pair of members being rotatable and being co-axial with said shaft,
   a phase adjustment hub co-axial with and connected to the shaft,
   wherein a first set of drive members includes a drive member of the first pair and a drive member of the second pair, and the first set of drive members is rotationally fixed with respect to the shaft,
   wherein a second set of drive members includes another drive member of the first pair and another drive member of the second pair, and the second set of drive members is rotatable with respect to said shaft and rotationally fixed with respect to the phase adjustment hub,
   wherein the phase adjustment hub is angularly adjustable with respect to the shaft; and
   wherein first pair and said second pair are relatively moveable with respect to each other in a direction parallel to said shaft.

2. A transport drive system for a carton transport conveyor, the transport drive system comprising:
- an elongated shaft,
- a first pair of drive members,
- a second pair of drive members,
- said first and second pair of members being rotatable and being co-axial with said shaft,
- a phase adjustment hub co-axial with and connected to the shaft,
- wherein a first set of drive members includes a drive member of the first pair and a drive member of the second pair, and the first set of drive members is rotationally fixed with respect to the shaft,
- wherein a second set of drive members includes another drive member of the first pair and another drive member of the second pair, and the second set of drive members is rotatable with respect to said shaft and rotationally fixed with respect to the phase adjustment hub,
- wherein the phase adjustment hub is angularly adjustable with respect to the shaft; and
- wherein first pair and said second pair are relatively moveable with respect to each other in a direction parallel to said shaft,
- wherein the shaft includes a worm gear and the phase adjustment hub includes a worm engaging the worm gear,
- said worm being rotatable about one axis and said worm gear being rotatable about another axis perpendicular to said one axis,
- wherein rotation of the worm causes rotation of the phase adjustment hub with respect to the shaft.

3. The transport drive system of claim 2,
- wherein the phase adjustment hub includes a housing including the worm, the worm being free to rotate with respect to the housing.

4. The transport drive system of claim 3,
- wherein the worm includes a knob extending from the housing for manipulation by a user.

5. The transport drive system of claim 4,
- wherein rotation of the knob causes rotation of the housing relative to the shaft.

6. The transport drive system of claim 3 further comprising at least two drive shafts connected to the phase adjustment hub and the second set of drive members.

7. A transport drive system for a carton transport conveyor, the transport drive system comprising:
- a shaft,
- a first pair of drive members fixed in translation along the shaft,
- a moving pair of drive members slidable in translation along the shaft with respect to the fixed pair,
- and a phase adjustment hub connected to the shaft,
- wherein a set of trailing drive members includes a drive member of the fixed pair and a drive member of the moving pair, with the trailing drive members rotationally fixed with respect to one of the shaft or the phase adjustment hub,
- wherein a set of leading drive members includes another leading drive member of the fixed pair and another leading drive member of the moving pair, with the leading drive members rotationally fixed with respect to the other of the shaft or the phase adjustment hub, and
- wherein the phase adjustment hub is angularly adjustable with respect to the shaft.

8. The transport drive system of claim 7,
- wherein the trailing drive members are adapted to drive trailing lug chains having trailing lugs, and
- wherein the leading drive members are adapted to drive leading lug chains having leading lugs.

9. A transport drive system for a carton transport conveyor, the transport drive system comprising:
- a shaft,
- a first pair of drive members fixed in translation along the shaft,
- a moving pair of drive members slidable in translation along the shaft with respect to the fixed pair,
- and a phase adjustment hub connected to the shaft,
- wherein a set of trailing drive members includes a drive member of the fixed pair and a drive member of the moving pair, with the trailing drive members rotationally fixed with respect to one of the shaft or the phase adjustment hub,
- wherein a set of leading drive members includes another leading drive member of the fixed pair and another leading drive member of the moving pair, with the leading drive members rotationally fixed with respect to the other of the shaft or the phase adjustment hub, and
- wherein the phase adjustment hub is angularly adjustable with respect to the shaft,
- wherein the trailing drive members are adapted to drive trailing lug chains having trailing lugs,
- wherein the leading drive members are adapted to drive leading lug chains having leading lugs, and
- wherein the shaft includes a worm gear and the phase adjustment hub operably engages the worm gear to provide relative rotation between the phase adjustment hub and the shaft.

10. The transport drive system of claim 9, further comprising an axial positioning system for moving the moving pair of drive members, the axial positioning system including a yoke extending from a transport beam of the carton transport conveyor and engaging the moving pair of drive members for axial movement along the shaft.

11. The transport drive system of claim 9,
- wherein the phase adjustment hub includes a body and a worm, the worm engaging the worm gear.

12. The transport drive system of claim 9, further comprising two drive shafts connected to the phase adjustment hub.

13. The transport drive system of claim 12, further comprising an extension between the phase adjustment hub and the two drive shafts, the extension and drive shafts being rotationally fixed with respect to the phase adjustment hub.

14. The transport drive system of claim 12, wherein the two drive shafts are connected to the leading drive members.

15. The transport drive system of claim 14, further comprising arcuate slots in the trailing drive members for receiving the two drive shafts.

16. The transport drive system of claim 15, further comprising a free spinning shaft support connected to the two drive shafts at an end opposite the phase adjustment hub.

17. A method for adjusting leading lugs with respect to trailing lugs in a transport drive system of a carton transport conveyor, the leading lugs being carried by leading lug chains and the trailing lugs being carried by trailing lug chains, and the leading lug chains being driven by leading lug chain drive sprockets and the trailing lug chains being driven by trailing lug chain drive sprockets, and the leading lug chain drive sprockets being rotationally fixed to one of a shaft or a phase adjustment hub and the trailing lug chain drive sprockets being rotationally fixed to the other of the shaft or phase adjustment hub, the method comprising:

adjusting the phase between the leading lug chain drive sprockets and the trailing lug chain drive sprockets by rotating a worm in engagement with a worm gear secured to the shaft, and wherein a first drive sprocket pair includes one of the leading lug chain drive sprockets and one of the trailing lug chain drive sprockets and a second drive sprocket pair includes another of the leading lug chain drive sprockets and another of the trailing lug chain drive sprockets, and the method further comprises slidably moving the first drive sprocket pair along the shaft with respect to the second drive sprocket pair.

18. The method for adjusting of claim 17, wherein the worm and worm gear are contained within a housing of the phase adjustment hub.

19. The method for adjusting of claim 17, including the step of adjusting the distance between said respective leading and trailing lugs by adjusting the phase between the respective leading and trailing sprockets to accommodate a carton depth.

20. A transport drive system for a carton transport conveyor, the transport drive system comprising:

a first pair of drive members, a second pair of drive members, said pairs being coaxial with each other along a coaxial direction, a first driver, and a second driver, wherein a first set of drive members includes a drive member of the first pair and a drive member of the second pair, and the first set of drive members is driven by the first driver, and wherein a second set of drive members includes another drive member of the first pair and another drive member of the second pair, and the second set of drive members is driven by the second driver, and wherein said first and second pairs of drive members are adjustable with respect to each other in said coaxial direction.

21. The transport drive system of claim 20, wherein the first set of drive members is connected to a shaft connected to the first driver and the second set of drive members is connected to a shaft connected to the second driver.

\* \* \* \* \*

UNITED STATES PATENT AND TRADEMARK OFFICE
CERTIFICATE OF CORRECTION

| | | |
|---|---|---|
| PATENT NO. | : 8,944,240 B2 | Page 1 of 1 |
| APPLICATION NO. | : 13/285559 | |
| DATED | : February 3, 2015 | |
| INVENTOR(S) | : Paul A. Frederick | |

It is certified that error appears in the above-identified patent and that said Letters Patent is hereby corrected as shown below:

In the Claims:

Column 8, line 65, "wherein first pair" should be ---wherein said first pair---.

Column 9, line 21, "wherein first pair" should be ---wherein said first pair---.

Signed and Sealed this
Seventeenth Day of May, 2016

Michelle K. Lee
*Director of the United States Patent and Trademark Office*